United States Patent [19]

Skamser

[11] Patent Number: 4,578,814

[45] Date of Patent: Mar. 25, 1986

[54] THERMALLY INSULATED FOOD BAG

[75] Inventor: Ingrid Skamser, Hoffman Estates, Ill.

[73] Assignee: Thermal Bags by Ingrid, Inc., Hoffman Estates, Ill.

[21] Appl. No.: 575,808

[22] Filed: Feb. 1, 1984

[51] Int. Cl.[4] ............... B65D 33/02; B65D 33/14; B65D 33/24; B65D 81/38

[52] U.S. Cl. ............... 383/99; 383/61; 383/110; 206/545

[58] Field of Search .......... 383/2, 84, 98, 99, 61, 383/110, 15, 16, 86; 150/52 F, 52 R; 206/545; 190/107; 224/901

[56] References Cited

U.S. PATENT DOCUMENTS

| | | | |
|---|---|---|---|
| 179,745 | 7/1876 | Blake | 383/99 X |
| 673,821 | 5/1901 | Rahn | 383/99 |
| 871,664 | 11/1907 | Beam | 383/99 X |
| 919,745 | 4/1909 | McCraw | 383/2 X |
| 1,153,377 | 9/1915 | Fourt | 150/52 R |
| 1,261,846 | 4/1918 | Osgood | 383/86 X |
| 1,636,838 | 7/1927 | Roser | 383/2 X |
| 1,639,418 | 8/1927 | Washburn | 150/52 F |
| 1,753,813 | 4/1930 | Washburn | 150/52 F |
| 2,343,260 | 3/1944 | Leader et al. | 383/99 X |
| 2,542,477 | 2/1951 | Cart | 190/107 X |
| 2,575,893 | 11/1951 | Seaman | 383/2 X |
| 2,745,524 | 5/1956 | Plotkin | 383/16 X |
| 2,772,713 | 12/1956 | Koret | 383/2 X |
| 3,066,847 | 12/1962 | Fortune | 383/110 X |
| 3,082,713 | 3/1963 | Elgin | 383/86 X |
| 3,203,551 | 8/1965 | Van Loan, Jr. | 383/91 X |
| 3,262,283 | 7/1966 | Taylor | 383/15 X |
| 3,428,103 | 2/1969 | Walsh | 383/110 X |
| 4,079,767 | 3/1978 | Howard | 224/901 X |
| 4,211,091 | 7/1980 | Campbell | 383/110 X |
| 4,211,267 | 7/1980 | Skovgaard | 383/110 |
| 4,286,639 | 9/1981 | Murphy | 383/61 X |
| 4,344,534 | 8/1982 | Sutton | 206/545 |

FOREIGN PATENT DOCUMENTS 78739  5/1983  European Pat. Off. ............ 383/61

Primary Examiner—William Price
Assistant Examiner—Sue A. Weaver
Attorney, Agent, or Firm—Laff, Whitesel, Conte & Saret

[57] ABSTRACT

A carrying case is disclosed which is in the nature of a soft-sided bag formed of thermally insulating flexible sheet material. A frame inside the bag holds it open for insertion of cardboard cartons each adapted to contain a hot pizza. At the opening of the bag are a plurality of flaps which fold over each and are adapted to be secured to each other by means of buckles and/or Velcro fasteners in order to retain the contents in place and prevent heat loss.

5 Claims, 5 Drawing Figures

THERMALLY INSULATED FOOD BAG

This invention relates generally to containers, and particularly to a soft-sided thermally insulated carrying bag.

BACKGROUND

There is a need in certain fields for soft-sided thermally insulated carrying cases. One particular application is in the ready-to-eat pizza field, where hot pies are packaged in rectangular cardboard cartons and delivered several cartons at a time to customers' homes or offices. It is desirable that these pies be carried in a convenient container which has a capacity of several cartons, and which is light so as not to add unduly to the delivery person's burden. In addition, the container should also be flexible so that it can be easily folded up when desired. But at the same time, such a container should have good thermal insulating qualities in order to keep the contents as warm as possible during delivery, and the material of which the container is made should be of such a nature that it does not become easily soiled if some of the contents should leak out of the cartons.

SUMMARY OF THE INVENTION

In order to accomplish these objectives, as well as others which are important in the delivery of ready-to-eat food items, the present invention provides a thermally insulated food carrier comprising panel means including thermally insulating flexible sheet material arranged to form a bag having at least a top panel and a bottom panel, and defining a side opening to facilitate insertion of containers of warm material into the bag. Closure means are provided, including thermally insulating flexible sheet means, a proximal portion of which is hinged to the panel means whereby the closure means moves from a first position, in which the closure means exposes the side opening in order to facilitate loading of the bag, to a second position in which the closure means covers the side opening in order to retain heat within the bag. Fastening means are adapted to secure a distal portion of the closure means to the panel means whereby to retain the closure means in the second position.

These features and advantages, as well as others which inhere in the various embodiments of the invention, will be more fully appreciated after a reading of the following detailed description, when taken in conjunction with the accompanying drawings, also described below.

DETAILED DESCRIPTION OF THE PREFERRED EMBODIMENTS

Figure 1:
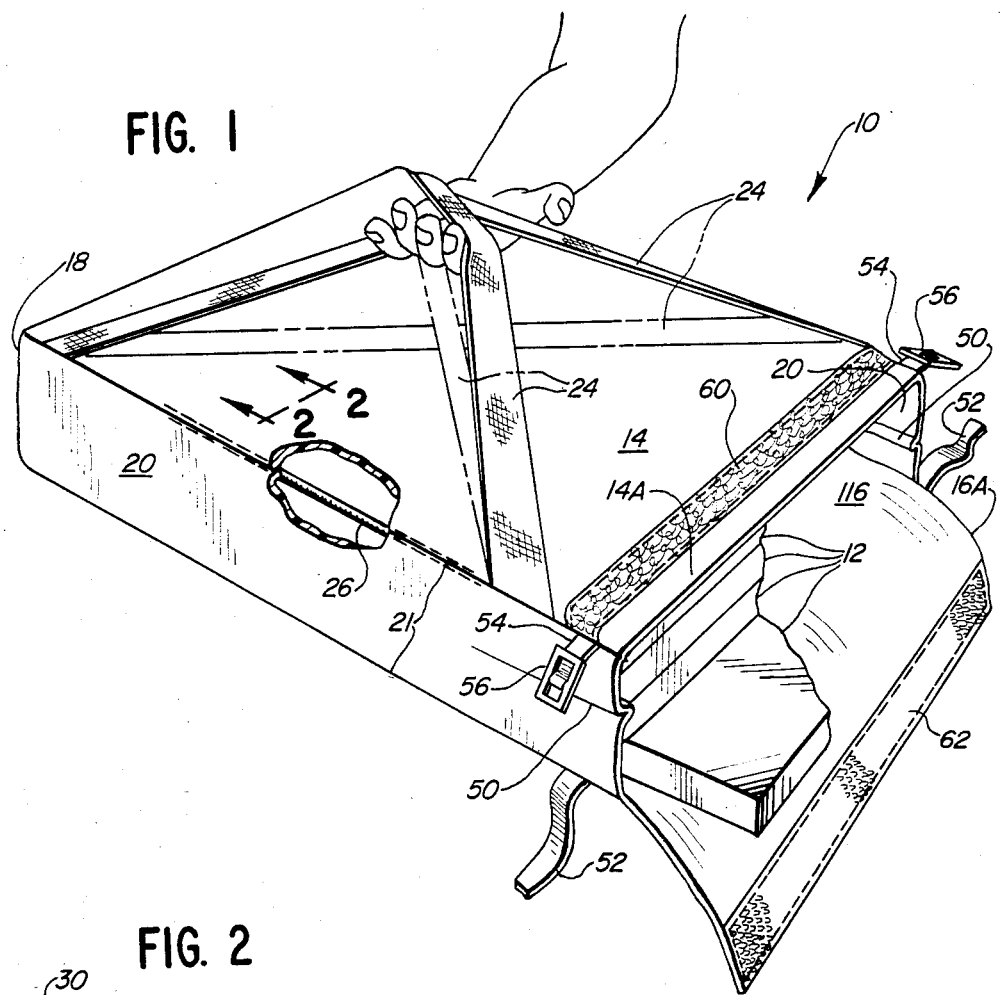
FIG. 1 is a perspective view of a first embodiment of a thermally insulated carrying bag in accordance with the present invention, with parts broken away to reveal details of internal construction.

Referring first to FIGS. 1 through 4, a thermally insulated container in accordance with the present invention, generally designated 10, is provided for the purpose of carrying a number of rectangular cardboard cartons 12 of the type in which hot pizza is customarily packaged for delivery to customer locations. The bag is formed of top panel 14, a bottom panel 16, a side panel, one edge of which is visible at 18, and a pair of opposite side panels 20. These panels are sewn or otherwise fastened to each other along seams 21. The top, bottom and side panels define a side opening 22 through which the pizza cartons 12 are loaded into the interior of the bag 10.

A pair of straps 24 are arranged in an X-configuration across the top panel 14, and their ends are sewn into the seams 21 between top panel 14 and side panels 20 in order to secure the straps to the bag for the purpose of providing a carrying handle. The straps also permit the bag to be worn by the delivery person as a backpack.

A rigid metal frame 26 is preferably inserted into the bag for the purpose of expanding it to its full volume in order to facilitate the insertion of the pizza cartons 12.

In order to minimize heat loss, and to keep the bag 10 as clean as possible, each of the panels mentioned above is formed of a thermally insulating and water-repellent material. Furthermore, in order to make the bag as light as possible and to permit it to be folded up when desired, these panels are formed of flexible sheets.

Figure 2:
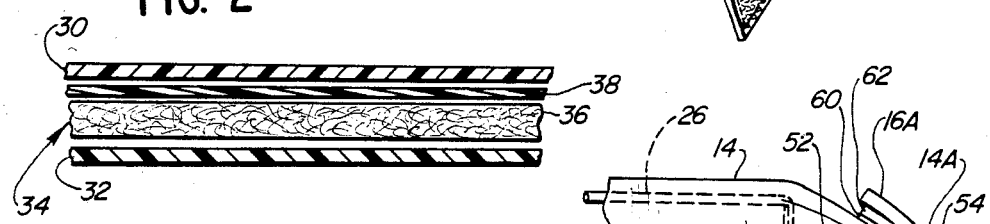
FIG. 2 is a fragmentary sectional view of the fabric sandwich employed in the bag of FIG. 1, taken along the lines 2—2.

The preferred material for this application is a three-layer sandwich of the kind illustrated in FIG. 2. On the outer surface of each panel is a water-repellant layer 30. On the inner surface of each panel is a waterproof layer 32. And between these two water-resistant layers is a thermally insulating layer 34. The latter layer is preferably made of a material such as that which is sold by Minnesota Mining & Manufacturing Co. (3M) under the trademark Thinsulate, which comprises a thin, porous sheet 36 of loosely packed plastic (preferably olefin and polyester) fibers bonded to a backing sheet 38. The inner lining 32 is preferably a material such as DuPont pack cloth. The outer layer 30 is preferably a material such as that which is sold by DuPont under the trademark Cordura. When so constructed, the entire bag 10 is a machine-washable.

At the bottom edge of the side opening 22 the bottom panel 16 has an integral extension 16A which serves as a main closure flap, while at the top edge of the side opening 22 the top panel 14 has a somewhat shorter integral extension 14A which a top auxiliary closure flap. The purpose of the closure flaps is to fold over the side opening 22 in order to secure the contents within the bag and to further minimize heat loss therefrom.

To assist in providing a heat-retaining closure, the side panels 20 are provided with respective gusset-forming sewn-in tucks or seams 50 extending down the middle of the side panels a short distance from the side opening 22. The gussets thus formed allow those portions of the side panels 20 which are beyond the edge of the pizza cartons 12 to collapse inwardly of the bag 10. In order to force them to collapse inwardly in such manner, pairs of tie straps 52 and 54 are provided on opposite sides of each gusset, and are secured in place by having their proximal ends sewn in to the adjacent seam 21.

Figure 3:
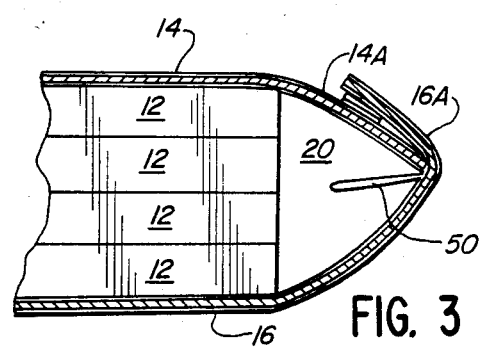
FIG. 3 is a fragmentary side elevational view of the bag of FIG. 1 when in its closed and secured condition, with parts sectioned for clarity of illustration.
Figure 4:
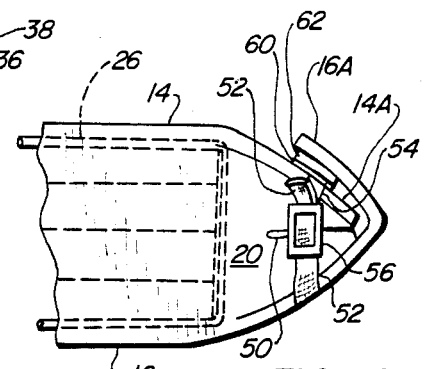
FIG. 4 is another fragmentary side elevational view of the bag of FIG. 1 when in its closed and secured condition.

In addition, the straps 54 are provided with buckles 56 which buckle up to the free, or distal, ends of their associated straps 52 so that the upper ends of each side panel can be pulled into a collapsed configuration. This closes off the sides of the side opening 22 of the bag 10, thus impeding communication at those locations with the cooler air outside the bag. The side straps further draw together the top and bottom panels to curl the bottom panel upward into a dish-like configuration in order to contain the contents of the bag in the event of spills. After the upper portions of the side panels 20 have been collapsed in this manner, the flag 14A is folded over the pizza cartons 12 as seen in FIGS. 3 and 4, and the flap 16A may then be folded over the flap 14A in order to complete the closure of the top opening 22.

In order to secure the flaps 14A and 16A in position to close the side opening 22, fasteners, preferably strips of cooperating textile hook and eye fasteners of the type sold under the Velcro trademark, are provided to secure the flap 16A in place over the flap 14A. A first Velcro strip 60 is sewn or otherwise attached to the upwardly facing surface of flap 14A, and a second Velcro strip 62 of a cooperating type is sewn or otherwise fastened to the downwardly facing surface of flap 16A. When the flap 14A is folded over, and the flap 16A is folded over flap 14A, the Velcro strips 60 and 62 engage to form a secure heat-retaining closure.

Figure 5:
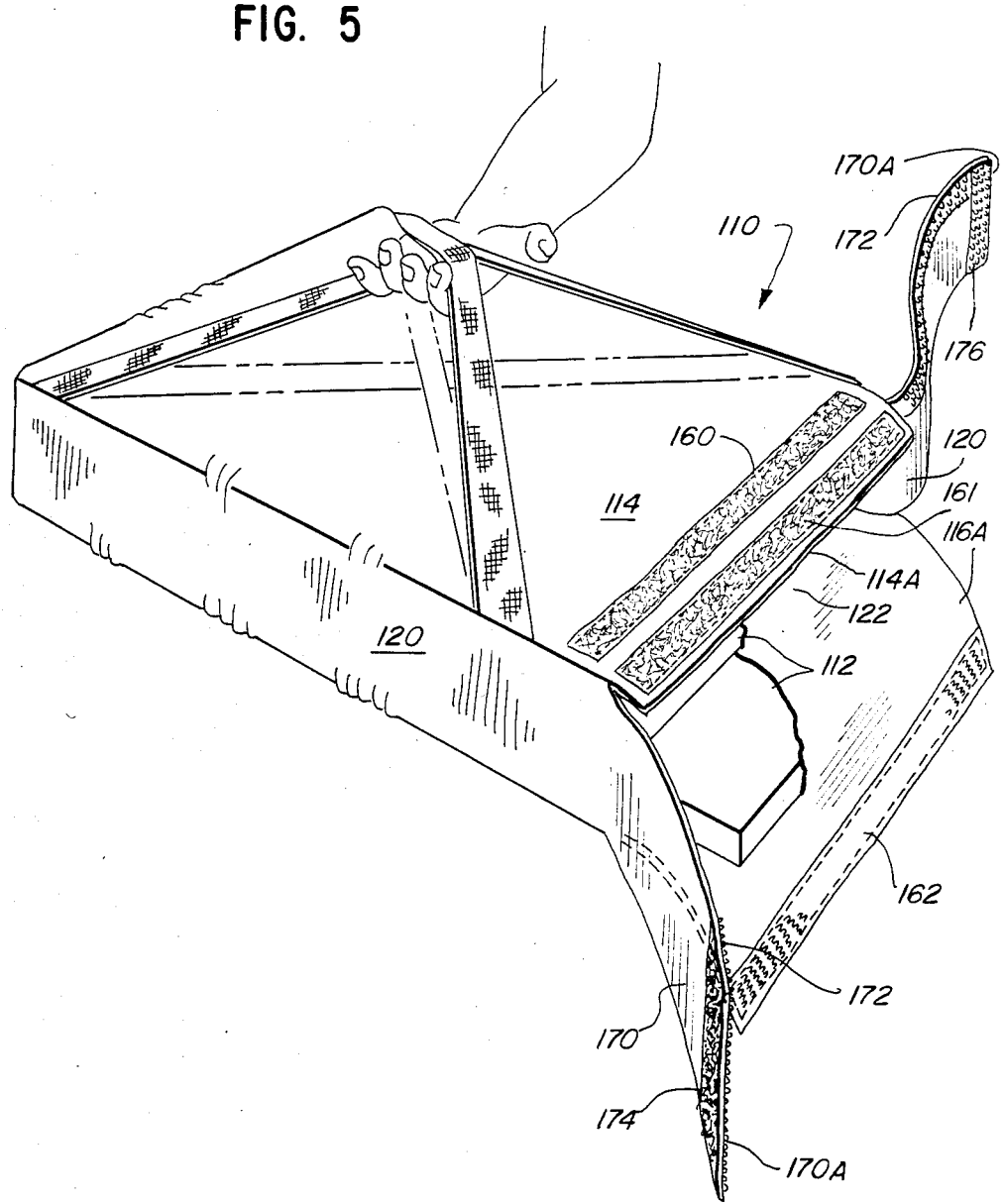
FIG. 5 is a perspective view of an alternative embodiment of a bag in accordance with this invention.

The alternative embodiment of FIG. 5 is a bag 110 very similar to that of FIGS. 1–4, but having a somewhat different closure system. In order to call the reader's attention to the similarities between these two structures, all elements in FIG. 5 which correspond to elements in FIGS. 1–4 are given reference numerals exactly 100 units higher than those given to the corresponding elements in FIGS. 1–4.

In the embodiment of FIG. 5 the side panels 120 do not have any gussets, but instead they are provided with integral extensions in the form of respective outwardly extending side auxiliary flaps 170. In addition, the top flap 114a is not attached to either of the side flaps 170. This permits the flap 114A to be folded flat over the pizza cartons 112 and each of the flaps 170 then to be folded flat over the flap 114A.

Furthermore, an additional Velcro strip 161 is secured to the outwardly facing surface of flap 114A in position to be enclosed by the flaps 170. To engage Velcro strip 161, both flaps 170 are provided with cooperating Velcro strips 172 on their respective inwardly facing surfaces and along their respective upper edges. Accordingly, regardless of which flap 170 is folded over first, the entire length of the Velcro strip 172 of that flap 170 will fasten securely to a portion of the length of the Velcro strip 161, and a portion of the length of the Velcro strip 172 of the other flap 170 will fasten securely to the remaining length of the Velcro strip 161.

In addition, the flaps 170 are long enough so that their respective outer edges 170A overlap when the flaps 170 are folded over each other, and these outer edges 170A are provided with respective Velcro fasteners 174 on the respective outwardly facing surfaces of their edges 170A, as well as respective Velcro fasteners 176 on the respective inwardly facing surfaces of those edges. Moreover, the Velcro fasteners 174 are of the type which cooperate with the Velcro fasteners 176. As a result, no matter which one of the flaps 170 is folded over the flap 114A first, the outwardly facing Velcro fastener 174 of that flap 170 will engage securely with the inwardly facing Velcro fastener 176 of the other flap 170 when the latter is folded thereover.

After both of the flaps 170 have been folded over, the flap 116A is then folded over both of the flaps 170 in turn, and the Velcro fastener 162 thereof securely engages with the Velcro fastener 160 on the top panel 114. This fully seals off the side opening 122 of bag 110 in both a thermal and a mechanical sense.

Thus a superior heat-retaining closure is formed by first folding the flap 114A flat over the pizza cartons 112, then folding both of the flaps 170 flat thereover in any order, causing the Velcro fasteners 172 of both flaps 170 to adhere to the Velcro fastener 161, and the Velcro fastener 174 of one of the flaps 170 to adhere to the Velcro fastener 176 of the other flap 170. Finally, the flap 116A is folded flat over the flaps 170, causing the Velcro fastener 162 to adhere to the Velcro fastener 160.

Because of the previously noted fact that the ends of the straps 24 are attached where the top panel 14 or 114 meets the side panels 20 or 120, the straps do not interfere with the opening and closing of the flaps 14A or 16A, or the flaps 114A, 116A, and 170; nor do they interfere with the operation of any of the Velcro fasteners described above.

It will now be appreciated that this invention provides a more practical and effective heat-retaining enclosure and carrying container for a number of carton-enclosed pizzas as they are being delivered to a customer's office or residence.

The foregoing detailed description specifies embodiments which are presently preferred, and which serve to illustrate this invention. But other embodiments may be imagined now or in the future which might incorporate one or more aspects of the invention. Therefore the scope of protection accorded should not be limited to the particulars of this description, but instead should be determined by the following claims. These claims, moreover, should be interpreted consistently with the general principles and novel teachings expressed herein.

The invention claimed is:

1. A thermally insulated carrier adapted for use in a horizontal attitude, comprising:
   panel means formed of thermally insulating flexible sheet material arranged to form a bag having at least a top panel and a bottom panel, and defining a side opening to facilitate horizontal insertion of containers of warm material into said bag;
   a main flap formed of thermally insulating flexible sheet material, a proximal portion of which is hingedly connected to said bottom panel along a bottom edge of said side opening;
   first fastening means upon a distal portion of said main flap and second fastening means near the top edge of said side opening for cooperating with said first fastening means to secure said main flap in place over said side opening;
   two side flaps formed of said thermally insulating flexible sheet material, proximal portions of which are hingedly connected to said panel means along respective side edges of said side opening for folding over said side opening;
   a top flap hingedly connected to said top panel at the top of said side opening and adapted to be folded over said side opening;

fastening means on an outer surface of said top flap for securing said top flap to said side flaps when said side flaps are folded over said top flap;

said side flaps being arranged to overlap each other when folded over said side opening;

and additional fastening means to secure said side flaps to each other when folded over said side opening in overlapping relationship to each other;

each of said side flaps having fastening means upon an inner surface thereof which is adapted to cooperate with, and positioned to engage, said fastening means upon said outer surface of said top flap;

and each of said side flaps having further fastening means upon an outer surface of a distal portion thereof, and further fastening means upon an inner surface of said distal portion thereof which is adapted to cooperate with, and positioned to engage, said further fastening means upon said outer surface of said distal portion of the other side flap.

2. Apparatus as in claim 1, wherein said thermally insulating sheet material comprises:

a sandwich including a first outer layer of water-repellent sheet material facing inwardly of said bag, a second outer layer of water-repellent sheet material facing outwardly of said bag, and an inner layer of thermally insulating sheet material sandwiched between said first and second outer layers.

3. A thermally insulated carrier as in claim 1, further comprising:

strap means on the exterior of said bag arranged in an X-configuration across said top panel and adapted for manipulating said bag in a horizontal position;

said strap means having strap ends secured exclusively to said panel means and exclusively at respective locations other than said side opening so as not to interfere with movement and fastening of said flaps.

4. Apparatus as in claim 1 wherein:

said fastening means comprises cooperating textile hook and pile fasteners on said flaps and said panel means respectively.

5. Apparatus as in claim 1 further comprising:

substantially rigid form retaining frame means within said bag adapted to hold said bag open to substantially its full volume to facilitate insertion of said containers thereinto.

* * * * *